United States Patent
Shiraiwa

(10) Patent No.: US 8,463,320 B2
(45) Date of Patent: Jun. 11, 2013

(54) WIRELESS TERMINAL DEVICE AND WIRELESS COMMUNICATION METHOD

(75) Inventor: Nobuyuki Shiraiwa, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/345,051

(22) Filed: Jan. 6, 2012

(65) Prior Publication Data

US 2012/0178497 A1    Jul. 12, 2012

(30) Foreign Application Priority Data

Jan. 7, 2011 (JP) ................................. 2011-001658

(51) Int. Cl.
*H04M 1/00* (2006.01)

(52) U.S. Cl.
USPC ..................... 455/552.1; 455/436; 455/404.1; 370/328; 370/331; 370/334

(58) Field of Classification Search
USPC ........... 455/455, 443, 552.1, 509, 436, 404.1; 370/254, 465, 282, 331, 297, 328, 332, 330, 370/334, 437; 379/93.07, 100.15, 100.08, 379/88.24; 358/403, 435; 710/65; 375/348, 375/347, 260
See application file for complete search history.

(56) References Cited

U.S. PATENT DOCUMENTS

| | | | |
|---|---|---|---|
| 2008/0025263 A1* | 1/2008 | Pelkonen | 370/332 |
| 2008/0316970 A1* | 12/2008 | Choi | 370/331 |
| 2009/0080385 A1* | 3/2009 | Kim et al. | 370/336 |
| 2010/0080194 A1* | 4/2010 | Kawasaki et al. | 370/332 |
| 2010/0296419 A1* | 11/2010 | Kim et al. | 370/297 |
| 2011/0164589 A1* | 7/2011 | Lee et al. | 370/331 |
| 2011/0189997 A1* | 8/2011 | Tiwari et al. | 455/443 |
| 2012/0071168 A1* | 3/2012 | Tomici et al. | 455/445 |
| 2012/0137368 A1* | 5/2012 | Vanstone et al. | 726/25 |

FOREIGN PATENT DOCUMENTS

JP    2009-540721 A    11/2009

* cited by examiner

*Primary Examiner* — Mahendra Patel
(74) *Attorney, Agent, or Firm* — Hoffmann & Baron, LLP

(57) ABSTRACT

When initiating data communication through an LTE standard, a control unit of a cellular telephone device causes a wireless communication unit to transmit a communication initiation request, and in a case of receiving information indicating that communication is enabled in response to the communication initiation request, the control unit causes the wireless communication unit to initiate data communication through the LTE standard. Moreover, in a case in which the wireless communication unit has failed to receive information indicating that communication is enabled, the control unit of the cellular telephone device causes the wireless communication unit to initiate wireless connection through the CDMA standard.

11 Claims, 6 Drawing Sheets

WIRELESS TERMINAL DEVICE AND WIRELESS COMMUNICATION METHOD

This application is based on and claims the benefit of priority from Japanese Patent Application No. 2011-001658, filed on 7 Jan. 2011, the content of which is incorporated herein by reference.

BACKGROUND OF THE INVENTION

1. Field of the Invention

The present invention relates to a wireless terminal device and a wireless communication method, which perform wireless communication through a plurality of communication standards.

2. Related Art

In recent years, as communication technologies are developed, various communication standards have been proposed. For example, a CDMA (Code Division Multiple Access) standard and an LTE (Long Term Evolution) standard have been proposed. In the CDMA standard, when terminating communication, an IP address is released, and when resuming communication, another IP address is acquired again, and data communication is initiated based on the IP address that was acquired again. In the LTE standard, even when terminating communication, a state where an IP address as communication information has been acquired is maintained, and when resuming communication, data communication is initiated based on the IP address.

A wireless terminal device that performs wireless communication through such a plurality of communication standards has been proposed. For example, Japanese Unexamined Patent Application (Translation of PCT Application), Publication No. 2009-540721 discloses a communication system that switches communication, which is performed through the LTE standard, to communication through a 2G/3G standard using the CDMA standard and the like.

SUMMARY OF THE INVENTION

Since the LTE standard takes time to detect failure in data communication, for example, in a case in which communication through the LTE standard has failed, it takes time even by attempting to switch the communication to communication through the 2G/3G standard.

An object of the present invention is to provide a wireless terminal device and a wireless communication method, which are capable of suppressing the time elapsing from an attempt to initiate communication to actual initiation of the communication, in a plurality of communication standards.

The wireless terminal device according to the present invention is a wireless terminal device that performs wireless communication in a state where communication information has been acquired through a plurality of communication standards, and the wireless terminal device includes: a wireless communication unit that performs wireless communication through any one of a first communication standard and a second communication standard, in which the first communication standard maintains a state where communication information has been acquired even after terminating communication, and initiates data communication based on the communication information when initiating communication again, and in which the second communication standard discards communication information when terminating communication, acquires communication information again when initiating communication again, and initiates data communication based on the communication information that has been acquired again; and a communication control unit that causes the wireless communication unit to transmit a communication initiation request when initiating data communication through the first communication standard, wherein, in a case of receiving information indicating that communication is enabled in response to the communication initiation request, the communication control unit causes the wireless communication unit to initiate data communication through the first communication standard.

Moreover, in the wireless terminal device, when transmitting the communication initiation request through the first communication standard, the control unit preferably suspends initiation of the data communication even in a state where the communication information has been acquired.

In addition, in the wireless terminal device, in a case of receiving information indicating that communication is enabled in response to the communication initiation request in a state where the initiation of the data communication is suspended, the communication control unit preferably cancels such a suspended state to initiate the data communication.

Furthermore, in the wireless terminal device, in a case of not receiving the information indicating that communication is enabled, the communication control unit preferably maintains a state where the communication information of the first communication standard has been acquired.

Moreover, in the wireless terminal device, the communication control unit preferably causes the wireless communication unit to initiate data communication through the second communication standard.

In addition, in the wireless terminal device, the communication control unit preferably performs communication through the first communication standard in priority to communication through the second communication standard.

Furthermore, in the wireless terminal device, the first communication standard is preferably an LTE (Long Term Evolution) standard, and the second communication standard is preferably a CDMA (Code Division Multiple Access) standard.

The wireless communication method according to the present invention is a wireless communication method implemented by a wireless terminal device that performs wireless communication through any one of a first communication standard and a second communication standard, in which the first communication standard maintains a state where communication information has been acquired even after terminating communication, and initiates data communication based on the communication information when initiating communication again, and in which the second communication standard discards communication information when terminating communication, acquires communication information again when initiating communication again, and initiates data communication based on the communication information that has been acquired again, and the method includes the steps of: transmitting a communication initiation request when initiating data communication through the first communication standard; and initiating data communication through the first communication standard in a case of receiving information indicating that communication is enabled in response to the communication initiation request.

According to the present invention, in a plurality of communication standards, it is possible to suppress the time elapsing from an attempt to initiate communication to actual initiation of the communication.

DETAILED DESCRIPTION OF THE INVENTION

Figure 1:
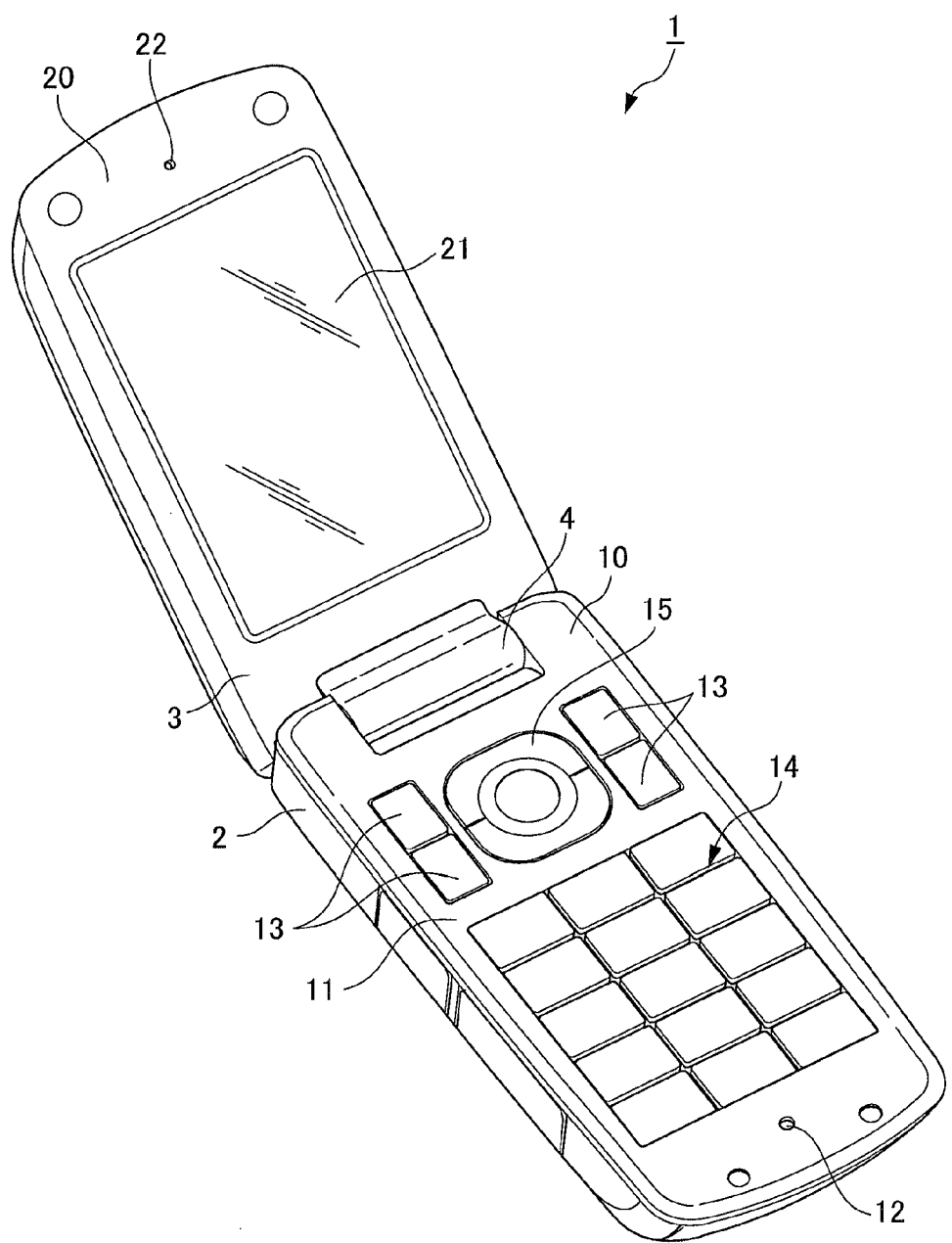
FIG. 1 is a perspective view showing an appearance of a cellular telephone device according to the present embodiment.

Descriptions are provided hereinafter regarding an embodiment of the present invention. FIG. 1 is a perspective view showing an appearance of a cellular telephone device 1 as an example of a wireless terminal device according to the present embodiment. It should be noted that, although FIG. 1 shows a so-called folder-type cellular telephone device, the cellular telephone device according to the present invention is not particularly limited thereto. For example, the type of the cellular telephone device may be: a slider type in which one of the bodies slides to one direction in a state in which the bodies are mutually superimposed; a rotating (turning) type in which one of the bodies is rotated around an axis line along the direction of superimposing the bodies; or a type (straight type or flip type) in which an operation unit and a display unit are disposed in one body without having a connecting portion.

The cellular telephone device 1 is configured to include an operation unit side body 2 and a display unit side body 3. The operation unit side body 2 is configured to include, on a front face portion 10 thereof, an operation unit 11 and a microphone 12 to which sound produced by a user of the cellular telephone device 1 during a phone call is input. The operation unit 11 is configured with: function setting operation keys 13 for operating various functions such as for various settings, a telephone number directory function and an email function; input operation keys 14 for inputting the digits of a telephone number and characters for email, and the like; and a selection operation key 15 for executing selection of the various operations, scrolling, and the like.

Moreover, the display unit side body 3 is configured to include, on a front face portion 20, an LCD (Liquid Crystal Display) display unit 21 for displaying a variety of information, and a speaker 22 for outputting sound of the other party of the conversation.

In addition, an upper end portion of the operation unit side body 2 and a lower end portion of the display unit side body 3 are connected via a hinge mechanism 4. Furthermore, the cellular telephone device 1 can be in a state where the operation unit side body 2 and the display unit side body 3 are apart from each other (opened state), and in a state where the operation unit side body 2 and the display unit side body 3 are contacting each other (folded state), as the operation unit side body 2 and the display unit side body 3, connected via the hinge mechanism 4, pivot with respect to each other.

Figure 2:
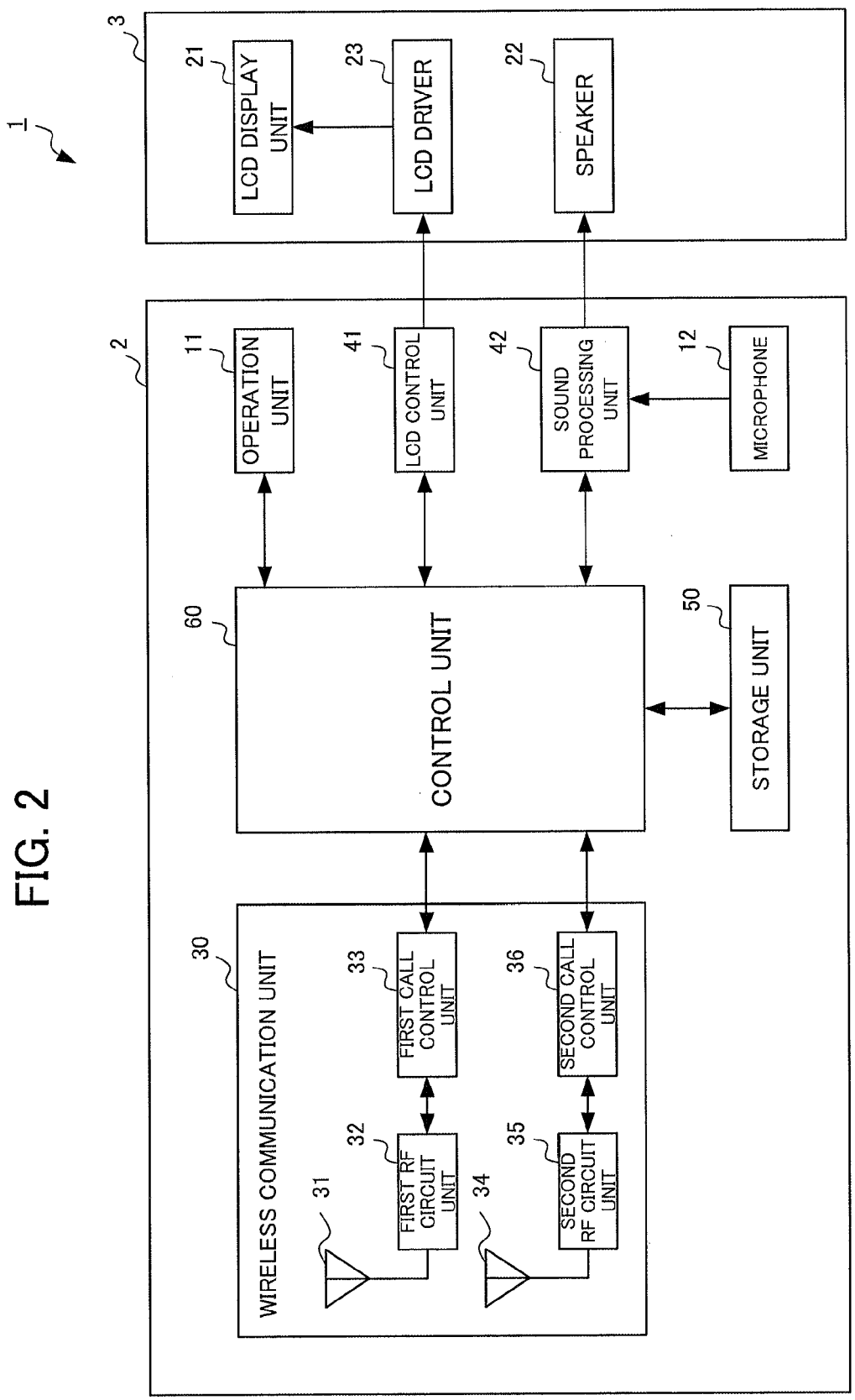
FIG. 2 is a functional block diagram showing functions of the cellular telephone device according to the present embodiment.

FIG. 2 is a functional block diagram showing functions of the cellular telephone device 1 according to the present embodiment.

As shown in FIG. 2, in the cellular telephone device 1, the operation unit side body 2 includes an operation unit 11, a microphone 12, a wireless communication unit 30, an LCD control unit 41, a sound processing unit 42, a storage unit 50, and a control unit 60 as a communication control unit. Moreover, in the cellular telephone device 1, the display unit side body 3 includes an LCD display unit 21, a speaker 22, and an LCD driver 23.

The wireless communication unit 30 performs wireless communication with a network (not illustrated) including external devices (not illustrated) such as base stations, through any one of an LTE (Long Term Evolution) standard as a first communication standard, and a CDMA (Code Division Multiple Access) standard as a second communication standard.

The LTE standard is a communication standard, in which, even when terminating communication, a state where an IP address as communication information has been acquired is maintained, and when resuming communication, data communication is initiated based on the IP address.

The CDMA standard is a communication standard, in which, when terminating communication, an IP address is released (communication information is discarded), and when resuming communication, an IP address is acquired again from a network composed of external devices such as base stations, and data communication is initiated based on the IP address that was acquired again.

In this way, in the present embodiment, wireless communication is performed with external devices such as base stations (not illustrated) through any one of the LTE standard and the CDMA standard; therefore, even in a case in which communication through one communication standard is disabled, communication is attempted through another communication standard, thereby making it possible to enhance the possibility of enabling communication.

This wireless communication unit 30 includes a first antenna 31, a first RF circuit unit 32, a first call control unit 33, a second antenna 34, a second RF circuit unit 35, and a second call control unit 36.

The first antenna 31 transmits and receives high frequency signals, which are modulated by way of a modulation method compatible with the LTE standard, to and from external devices such as base stations.

The first RF circuit unit 32 processes the high frequency signals that are transmitted and received via the first antenna 31. More specifically, the first RF circuit unit 32 demodulates the signals, which are received via the first antenna 31, by way of a demodulation method compatible with the LTE standard, and transmits the signals thus processed to the first call control unit 33. Moreover, the first RF circuit unit 32 modulates signals, which are transmitted from the first call control unit 33, through a modulation method compatible with the LTE standard, and transmits the signals to external devices such as base stations via the first antenna 31.

In a case in which an IP address has already been acquired, in response to accepting a request for initiating data communication from the control unit 60, the first call control unit 33 transmits a communication initiation request to the network (external devices) via the first antenna 31 and the first RF circuit unit 32. In addition, in a case of receiving information from the network indicating that communication is enabled, the first call control unit 33 reports the information to the control unit 60 via the first antenna 31 and the first RF circuit unit 32. Furthermore, in a case of not being able to receive such information from the network, the first call control unit 33 reports information, which indicates that communication has failed, to the control unit 60 via the first antenna 31 and the first RF circuit unit 32.

The second antenna 34 transmits and receives high frequency signals, which are modulated by way of a modulation method compatible with the CDMA standard, to and from external devices such as base stations.

The second RF circuit unit 35 processes the high frequency signals that are transmitted and received via the second antenna 34. More specifically, when the signals are received via the second antenna 34, the second RF circuit unit 35 demodulates the signals by way of a demodulation method compatible with the CDMA standard, and transmits the signals thus processed to the second call control unit 36. Moreover, when the signals are transmitted from the second call control unit 36, the second RF circuit unit 35 modulates signals by way of a modulation method compatible with the CDMA standard, and transmits the signals to external devices such as base stations via the second antenna 34.

In response to accepting a request for initiating wireless connection from the control unit 60, the second call control unit 36 transmits a wireless connection request to the network via the second antenna 34 and the second RF circuit unit 35. In addition, in a case of receiving information from the network indicating that wireless connection is established, the second call control unit 36 reports the information to the control unit 60 via the second antenna 34 and the second RF circuit unit 35. Furthermore, in a case of not being able to receive such information from the network, the second call control unit 36 reports information, which indicates that establishment of wireless connection has failed, to the control unit 60 via the second antenna 34 and the second RF circuit unit 35.

The LCD control unit 41 executes predetermined image processing according to control by the control unit 60, and outputs image data thus processed to the LCD driver 23. The LCD driver 23 includes frame memory, and stores the image data transmitted from the LCD control unit 41 in the frame memory. In addition, the LCD driver 23 outputs the image data stored in the frame memory to the LCD display unit 21 or a sub LCD display unit (not illustrated) at predetermined timing.

According to control by the control unit 60, the sound processing unit 42 executes predetermined sound processing to generate electric signals, and outputs the electric signals to the speaker 22. The speaker 22 externally outputs the signals transmitted from the sound processing unit 42. Moreover, the sound processing unit 42 processes electrical signals input from the microphone 12, and outputs the signals thus processed to the control unit 60.

For example, the storage unit 50 is configured with memory for storing information, and is utilized for arithmetic processing by the control unit 60. In addition, the storage unit 50 stores applications capable of communication (communication applications), and stores communication statuses of the cellular telephone device 1. Furthermore, the storage unit 50 stores information for determining a communication standard. It should be noted that the storage unit 50 may also serve as detachable external memory.

Descriptions are hereinafter provided for communication statuses. The communication statuses are different between the LTE standard and the CDMA standard. The communication statuses in the LTE standard include "ACTIVE_DISABLED", "ACTIVE_COMING_UP", "ACTIVE_UP", and "ACTIVE_DOWN".

"ACTIVE_DISABLED" is a status indicating that a communication application is not activated.

"ACTIVE_COMING_UP" is a status indicating that an IP address has already been acquired in the LTE standard, and communication initiation by a communication application is in process.

"ACTIVE_UP" is a status indicating that an IP address has already been acquired in the LTE standard, and is a status for reporting to the communication application that communication is enabled.

"ACTIVE_DOWN" is a status indicating that an IP address has already been acquired in the LTE standard, and is a status for reporting to the communication application that communication has failed. The IP address is assumed not to be released in this status.

The communication statuses in the CDMA standard include "DOWN", "UP" and "COMING_UP".

"UP" is a status indicating that an IP address has already been acquired in the CDMA standard.

"DOWN" is a status indicating that an IP address is not acquired in the CDMA standard.

"COMING_UP" is a status indicating that an IP address is in process of being acquired, in which wireless connection is attempted to be established.

It should be noted that the communication statuses of the LTE standard in the cellular telephone device 1 in the present embodiment communication statuses that are newly provided, and do not exist in the conventional LTE standard. In other words, communication statuses of the LTE standard in conventional cellular telephone devices include "DOWN", "UP" and "COMING_UP" described above.

Descriptions are hereinafter provided for a flow of processing data transmission in the LTE standard of the conventional cellular telephone devices. It should be noted that, in a conventional cellular telephone device 1, a control unit is denoted by a reference numeral 60A, and a wireless communication unit is denoted by a reference numeral 30A. Moreover, although a communication application 61A is a program executed by the control unit 60A, the communication application 61A in FIG. 5 is described to execute processing that is different from processing executed by the control unit 60A.

Figure 5:
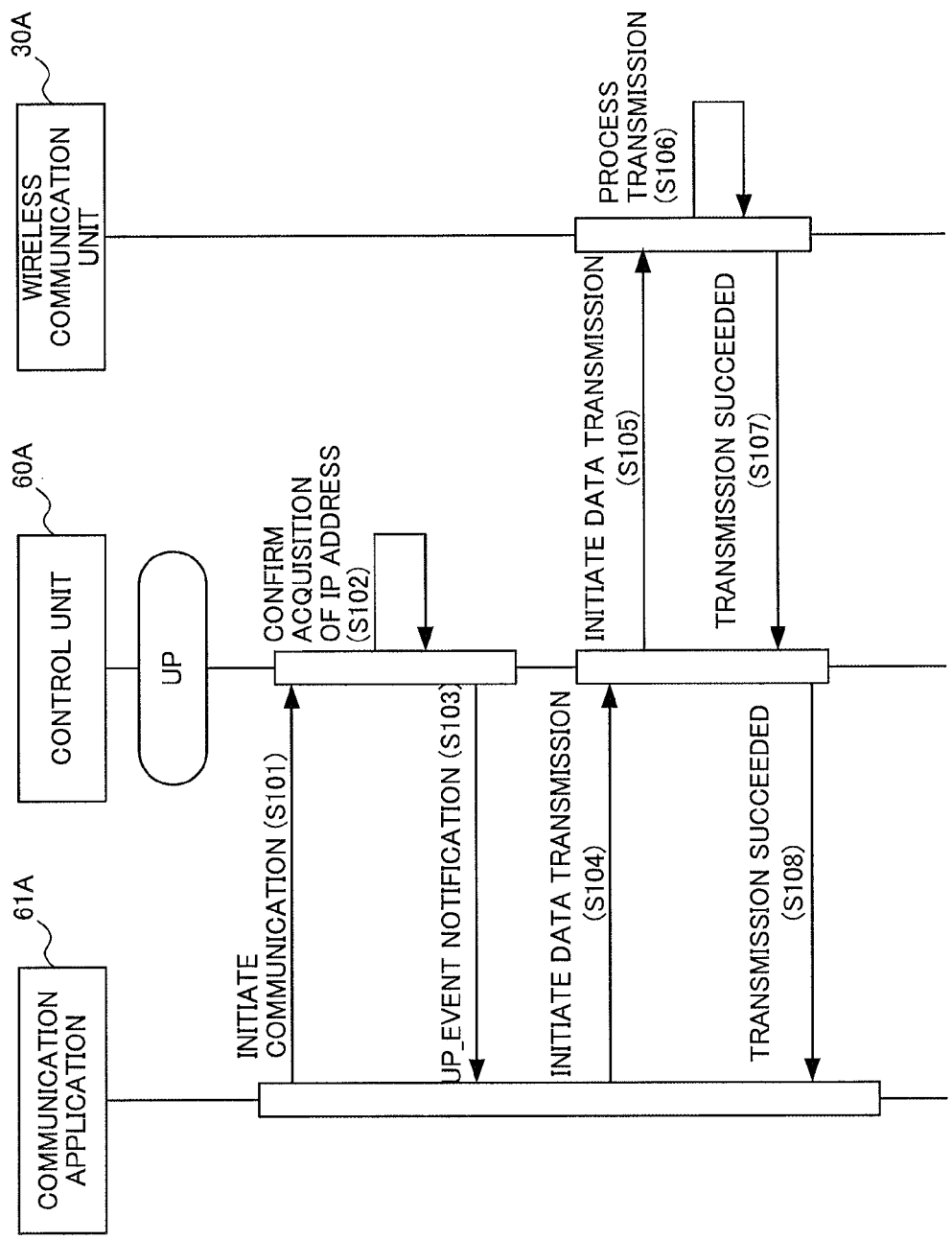
FIG. 5 is a sequence diagram showing a flow of processing data transmission in a case in which communication through the LTE standard is enabled in a conventional cellular telephone device.

FIG. 5 is a sequence diagram showing a flow of processing data transmission in a case in which communication through the LTE standard is enabled in the conventional cellular telephone device.

In Step S101, the control unit 60A accepts a communication initiation request from the communication application 61A.

In Step S102, the control unit 60A confirms whether an IP address has been acquired through the LTE standard. Here, descriptions are continued by assuming that an IP address has already been acquired through the LTE standard, and the communication status is "UP".

In Step S103, since the communication status is "UP", the control unit 60A reports to the communication application 61A through "UP_EVENT" that communication is enabled.

Subsequently, in the communication application 61A, data transmission is initiated in response to being reported that communication is enabled, and data transmission using the LTE standard is performed via the control unit 60A and the wireless communication unit 30A (Steps S104 to S106). In addition, in response to succeeding in data transmission, the wireless communication unit 30A reports to the communication application 61A that transmission has succeeded (Steps S107 and S108).

Figure 6:
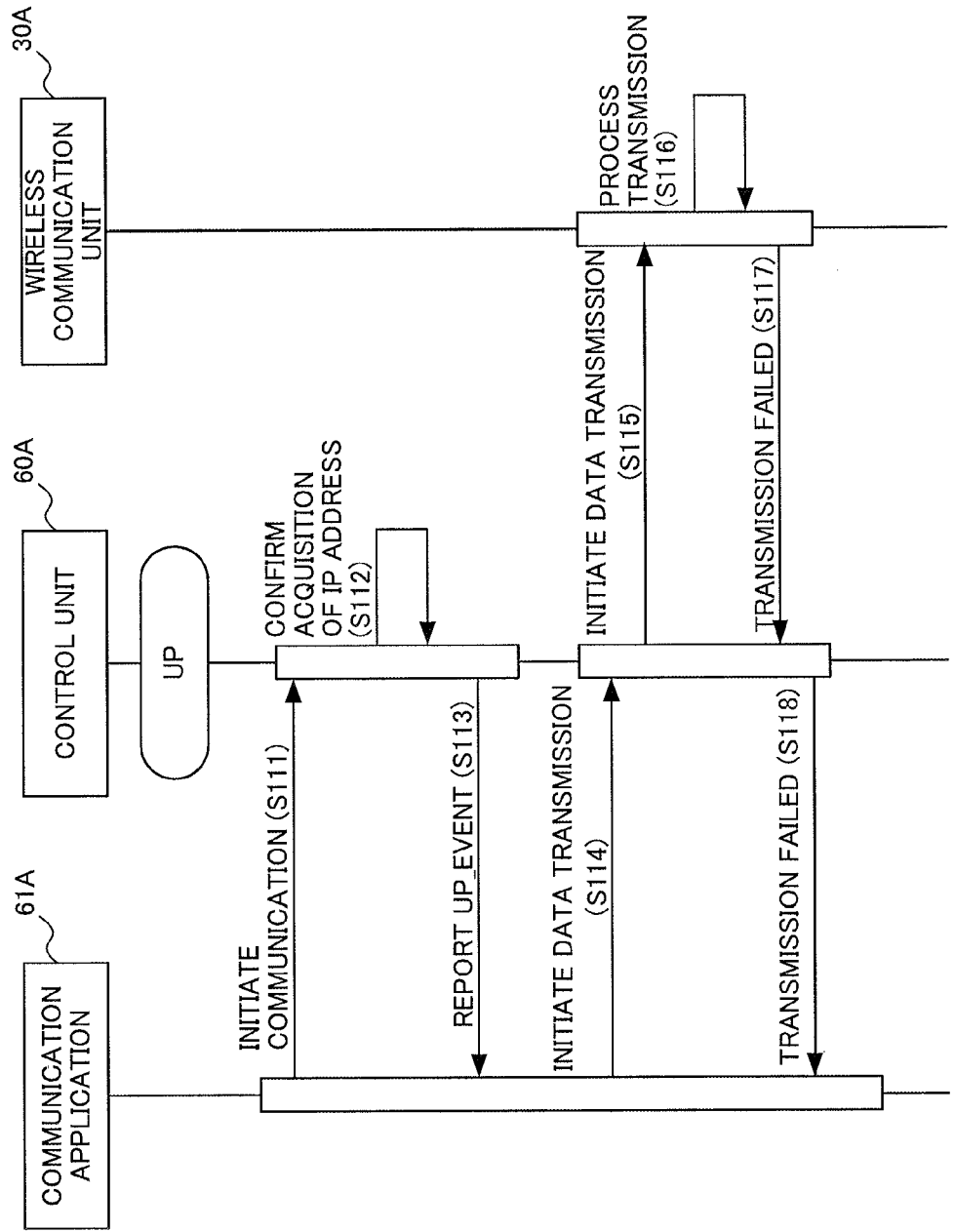
FIG. 6 is a sequence diagram showing a flow of processing data transmission in a case in which communication through the LTE standard is disabled in the conventional cellular telephone device.

FIG. 6 is a sequence diagram showing a flow of processing data transmission in a case in which communication through the LTE standard is disabled in the conventional cellular telephone device.

In Step S111, the control unit 60A accepts a communication initiation request from the communication application 61A.

In Step S112, the control unit 60A confirms whether an IP address has been acquired through the LTE standard. Here, descriptions are continued by assuming that an IP address has already been acquired through the LTE standard, and the communication status is "UP".

In Step S113, since the communication status is "UP", the control unit 60A reports to the communication application 61A through "UP_EVENT" that communication is enabled.

Subsequently, in the communication application 61A, data transmission is initiated in response to being reported that communication is enabled, and data transmission using the LTE standard is performed via the control unit 60A and the wireless communication unit 30A (Steps S114 to S116). In addition, in response to failing in data transmission, the wireless communication unit 30A reports to the communication application 61A that transmission has failed (Steps S117 and S118).

In other words, in the conventional cellular telephone device, even in a case in which communication through the LTE standard is disabled, as long as an IP address has been acquired, "UP_EVENT" will be reported to the communication application, and data transmission processing will be executed in fact. Consequently, in the conventional cellular telephone device, it takes time to report to the communication application 61A that data transmission has failed.

The description returns to the cellular telephone device 1 of the present embodiment.

The control unit 60 is configured with a central processing unit (CPU) and the like, and controls the entirety of the cellular telephone device 1. The control unit 60 performs, for example, predetermined control for the wireless communication unit 30, the LCD control unit 41, the sound processing unit 42 and the like. Moreover, the control unit 60 accepts inputs from the operation unit 11 and the like to execute a variety of processing. In addition, when executing such processing, the control unit 60 controls the storage unit 50 to read various programs and data and to write data. Furthermore, in a case in which the communication status of the LTE standard has transitioned to "ACTIVE_UP", or in a case in which the communication status of the CDMA standard has transitioned to "UP", the control unit 60 issues "UP_EVENT" as an event indicating that communication is enabled. Detailed functions of the control unit 60 will be described later.

In the cellular telephone device 1 with such a configuration, for example, in a case in which the control unit 60 performs data communication in response to activation of the communication application stored in the storage unit 50, the wireless communication unit 30 performs communication through the LTE standard in priority to communication through the CDMA standard. Detailed descriptions are hereinafter provided for the control unit 60.

When initiating data communication through the LTE standard, the control unit 60 causes the wireless communication unit 30 to transmit a communication initiation request, and in a case in which the wireless communication unit 30 has received information from the network indicating that communication is enabled in response to the communication initiation request, the control unit 60 causes the wireless communication unit 30 to initiate data communication through the LTE standard.

Moreover, in a case in which the wireless communication unit 30 has failed to receive information from the network indicating that communication is enabled, the control unit 60 causes the wireless communication unit 30 to initiate wireless connection through the CDMA standard. More specifically, in a case in which the wireless communication unit 30 has failed to receive information from the network indicating that communication is enabled, the control unit 60 maintains a state where an IP address compatible with the LTE standard has been acquired, and causes the wireless communication unit 30 to initiate wireless connection through the CDMA standard.

Figure 3:
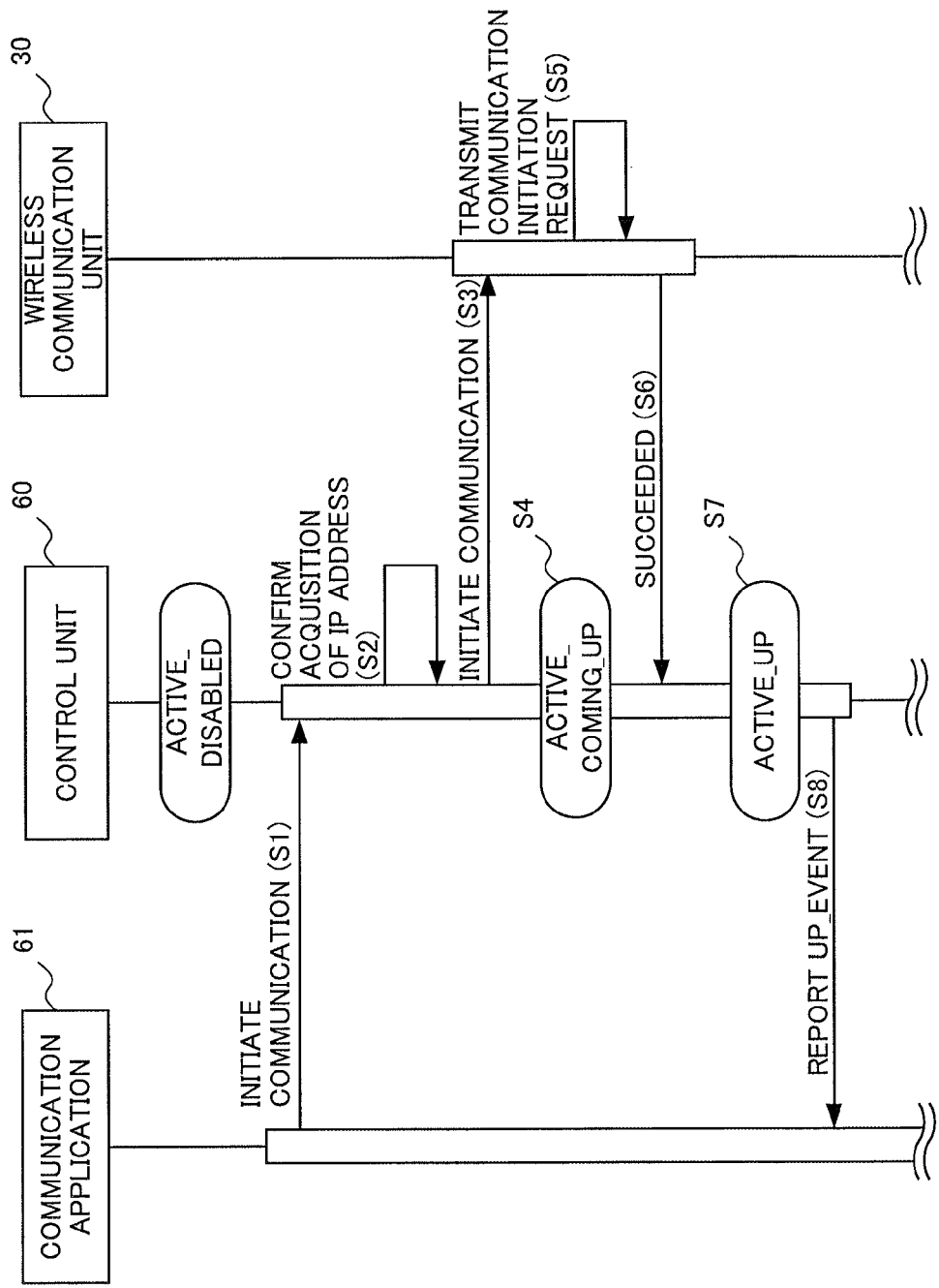
FIG. 3 is a sequence diagram showing a flow of processing data transmission in a case in which communication through an LTE standard is enabled in the cellular telephone device according to the present embodiment.

FIG. 3 is a sequence diagram showing a flow of processing data transmission in a case in which communication through the LTE standard is enabled in the cellular telephone device according to the present embodiment. It should be noted that the communication status in LTE standard stored in the storage unit 50 is assumed to be "ACTIVE_DISABLED" when initiating processing in the sequence diagram. In addition, although a communication application 61 is a program executed by the control unit 60, the communication application 61 in FIG. 3 is described to execute processing that is different from processing executed by the control unit 60.

In Step S1, the control unit 60 accepts a communication initiation request from the communication application 61.

In Step S2, the control unit 60 confirms whether the cellular telephone device 1 has acquired an IP address through the LTE standard. Here, descriptions are continued by assuming that an IP address has already been acquired through the LTE standard.

In Step S3, the control unit 60 transmits a communication initiation request to the first call control unit 33 of the wireless communication unit 30.

In Step S4, the control unit 60 sets the communication status in the LTE standard stored in the storage unit 50 to "ACTIVE_COMING_UP". In this way, by setting the status to "ACTIVE_COMING_UP", even in a state where an IP address has been provided (acquired), a response to the communication initiation from the communication application 61 is suspended.

In Step S5, in response to accepting the communication initiation request from the control unit 60, the first call control unit 33 of the wireless communication unit 30 transmits the communication initiation request to an external server, which is a communication destination of the communication application 61, via the network. It should be noted that the processing in Step S4 and the processing in Step S5 are executed in parallel, and may be executed in any order without limitation.

In Step S5, when the first call control unit 33 of the wireless communication unit 30 receives information from the external server via the network indicating that communication is enabled, the first call control unit 33 of the wireless communication unit 30 transmits the information indicating that communication is enabled to the control unit 60 (Step S6).

In Step S7, in response to receiving the information indicating that communication is enabled in Step S6, the control unit 60 sets the communication status in the LTE standard stored in the storage unit 50 to "ACTIVE_UP", and cancels the suspended state.

In Step S8, in response to transitioning of the communication status to "ACTIVE_UP", the control unit 60 reports to the communication application 61 through "UP_EVENT" that communication is enabled.

Subsequently, in the communication application 61, data transmission is initiated in response to being reported that communication is enabled, and data transmission using the LTE standard is performed via the control unit 60 and the first call control unit 33.

Figure 4:
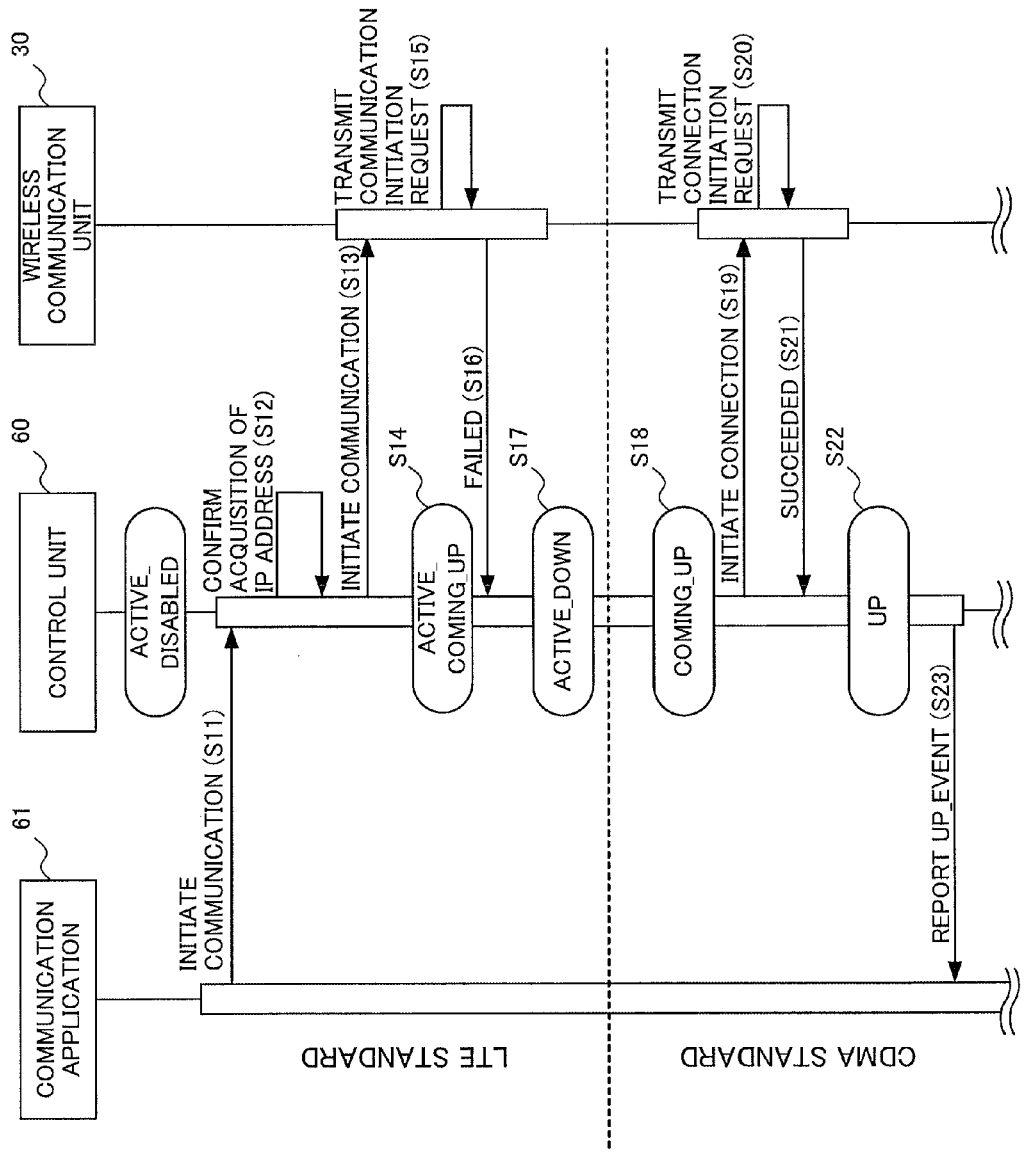
FIG. 4 is a sequence diagram showing a flow of processing data transmission in a case in which communication through the LTE standard is disabled in the cellular telephone device according to the present embodiment.

FIG. 4 is a sequence diagram showing a flow of processing data transmission in a case in which communication through the LTE standard is disabled in the cellular telephone device according to the present embodiment. It should be noted that the communication status in LTE standard stored in the storage unit 50 is assumed to be "ACTIVE_DISABLED" when initiating the processing in the sequence diagram.

Since the processing in Steps S11 to S14 is the same as the processing in Steps S1 to S4 shown in the FIG. 3, descriptions thereof are omitted.

In Step S15, in response to accepting the communication initiation request from the control unit 60, the first call control unit 33 of the wireless communication unit 30 transmits the communication initiation request to the external server, which is a communication destination of the communication application 61, via the network. Here, it is assumed that, in the processing in Step S15, the first call control unit 33 of the wireless communication unit 30 has failed to receive information from the external server via the network indicating that communication is enabled.

In Step S16, the first call control unit 33 of the wireless communication unit 30 transmits information indicating that communication has failed to the control unit 60.

In Step S17, the control unit 60 sets the communication status in the LTE standard stored in the storage unit 50 to "ACTIVE_DOWN". By setting this way, the IP address compatible with the LTE standard is maintained without being released. In other words, this setting maintains the state where the IP address that is compatible with the LTE standard has been acquired.

Subsequently, the control unit 60 initiates communication through the CDMA standard.

In Step S18, the control unit 60 sets the communication status in the CDMA standard stored in the storage unit 50 to "COMING_UP".

In Step S19, in response to transitioning of the communication status in the CDMA standard stored in the storage unit 50 to "COMING_UP" in Step S18, the control unit 60 causes the second call control unit 36 of the wireless communication unit 30 to initiate wireless connection through the CDMA standard.

In Step S20, in response to accepting the communication connection request from the control unit 60, the second call control unit 36 of the wireless communication unit 30 transmits the communication connection request to the external server, which is a communication destination of the communication application 61, via the network. Here, descriptions are continued by assuming that the second call control unit 36 of the wireless communication unit 30 has established wireless connection with the external server. In this case, the second call control unit 36 of the wireless communication unit 30 transmits information indicating that communication is enabled to the control unit 60 (Step S21).

In Step S22, in response to receiving the information indicating that communication is enabled in Step S21, the control unit 60 sets the communication status in the CDMA standard stored in the storage unit 50 to "UP".

In Step S23, in response to transitioning of the communication status to "UP", the control unit 60 reports to the communication application 61 through "UP_EVENT" that communication is enabled.

Subsequently, in the communication application 61, data transmission is initiated in response to being reported that communication is enabled, and data transmission using the CDMA standard is performed via the control unit 60 and the first call control unit 33.

As described above, according to the present embodiment, when initiating data communication through the LTE standard, the control unit 60 causes the wireless communication unit 30 to transmit a communication initiation request, and in a case in which the wireless communication unit 30 has received information from the network indicating that communication is enabled in response to the communication initiation request, the control unit 60 causes the wireless communication unit 30 to initiate data communication through the LTE standard.

Therefore, instead of the LTE standard of the conventional cellular telephone device that initiates data communication on condition that an IP address is maintained, in the cellular telephone device 1, when initiating data communication through the LTE standard, data communication is initiated through the LTE standard after actually confirming that communication is enabled through the LTE standard. Therefore, in the cellular telephone device 1, since data transmission will not fail after having actually transmitting data, it is possible to suppress the time elapsing from an attempt to initiate communication to actual initiation of the communication.

Moreover, in a case in which the wireless communication unit 30 has failed to receive information from the network indicating that communication is enabled, the control unit 60 causes the wireless communication unit 30 to initiate wireless connection through the CDMA standard.

Therefore, when initiating data communication through the LTE standard in the cellular telephone device 1, data communication is initiated through the LTE standard in a case in which the communication is enabled, and wireless connection is initiated through the CDMA standard in a case in which the communication is disabled; therefore, communication can be switched without requiring the user's operations and the like. Accordingly, in the cellular telephone device 1, in a plurality of communication standards, it is possible to suppress the time elapsing from an attempt to initiate communication to actual initiation of the communication.

Moreover, the control unit 60 performs communication through the LTE standard in priority to communication through the CDMA standard. Since the LTE standard maintains an IP address even in a state where data communication is not performed, the IP address is not required to be acquired again when initiating data communication again; therefore, the processing time until initiating communication is shorter than the processing time in the CDMA standard in which an IP address is acquired afresh each time data communication is performed. Therefore, the cellular telephone device 1 can suppress the time elapsing from an attempt to initiate communication to actual initiation of the communication, as compared to a case in which communication is performed through the CDMA standard in priority to communication through the LTE standard.

In addition, when transmitting a communication initiation request through the LTE standard, the control unit 60 suspends initiation of data communication even in a state where an IP address has been acquired. Furthermore, in a case of receiving information indicating that communication is enabled in response to a communication initiation request, the control unit 60 cancels a suspended state, and initiates data communication. By doing this way, in the LTE standard, data communication will not be initiated even in a case in which an IP address has been acquired and wireless communication is disabled. Therefore, in the cellular telephone device 1, in a case in which an IP address has been acquired, and wireless communication is disabled, it is possible to prevent data communication from being initiated and resulting in an error.

Moreover, in a case in which the wireless communication unit 30 has failed to receive information from the network indicating that communication is enabled, the control unit 60 maintains a state where an IP address that is compatible with the LTE standard has been acquired, and causes the wireless communication unit 30 to initiate wireless connection through the CDMA standard. By doing this way, in the cellular telephone device 1, in a case in which communication through the LTE standard is disabled for a short period of time, the IP address will not be released. Therefore, in the cellular telephone device 1, in a case in which communication through the LTE standard is enabled again, the IP address will not be acquired again; accordingly, it is possible to omit the time for acquiring an IP address.

Although an embodiment of the present invention has been described above, the present invention is not limited to the aforementioned embodiment. In addition, the effects described in the embodiment of the present invention merely exemplify the most preferable effects arising from the present invention, and the effects according to the present invention are not limited to those described in the embodiment of the present invention.

What is claimed is:

1. A wireless terminal device that performs wireless communication based on communication information, the wireless terminal device comprising:
   a wireless communication unit that performs wireless communication through any one of a LTE (Long Term Evolution) standard and a CDMA (Code Division Multiple Access) standard,
   wherein the wireless terminal device maintains communication information compatible with the LTE standard even after communication in accordance with the LTE standard has been terminated,
   the maintained communication information having been acquired prior to terminating communication in accordance with the LTE standard,
   the wireless terminal device re-initiating data communication based on the maintained communication information when re-initiating communication in accordance with the LTE standard following initiation of communication in accordance with the CDMA standard; and
   a communication control unit that causes the wireless communication unit to transmit a communication initiation request when initiating data communication in accordance with the LTE standard,
   wherein, in a case of receiving information indicating that communication is enabled in response to the communication initiation request, the communication control unit causes the wireless communication unit to initiate data communication in accordance with the LTE standard,
   wherein the communication information comprises an IP address compatible with the LTE standard,
   the communication control unit performing communication in accordance with the LTE standard in priority to performing communication in accordance with the CDMA standard,
   wherein the communication control unit causes the wireless communication unit to initiate data communication in accordance with the CDMA standard.

2. The wireless terminal device according to claim 1, wherein, when transmitting the communication initiation request in accordance with the LTE standard, the control unit suspends initiation of the data communication even in a state where the communication information has been acquired.

3. The wireless terminal device according to claim 2, wherein, in a case of receiving information indicating that communication is enabled in response to the communication initiation request in a state where the initiation of the data communication is suspended, the communication control unit cancels such a suspended state to initiate the data communication.

4. The wireless terminal device according to claim 1, wherein, in a case of not receiving the information indicating that communication is enabled, the communication control unit maintains a state where the communication information in accordance with the LTE standard has been acquired.

5. A wireless communication method comprising:
   transmitting a communication initiation request when initiating data communication in accordance with a LTE (Long Term Evolution) standard; and
   initiating data communication in accordance with the LTE standard in a case of receiving information indicating that communication is enabled in response to the communication initiation request,
   the wireless communication method being implemented by a wireless terminal device that performs wireless communication through any one of the LTE standard and a CDMA (Code Division Multiple Access) standard,
   wherein the wireless terminal device maintains communication information compatible with the LTE standard even after communication in accordance with the LTE standard has been terminated,
   the maintained communication information having been acquired prior to terminating communication in accordance with the LTE standard,
   the wireless terminal device re-initiating data communication based on the maintained communication information when re-initiating communication in accordance with the LTE standard following initiation of communication in accordance with the CDMA standard,
   wherein the communication information comprises an IP address compatible with the LTE standard,
   the communicating control unit performing communication in accordance with the LTE standard in priority to performing communication in accordance with the CDMA standard,
   wherein the communication control unit causes the wireless communication unit to initiate data communication in accordance with the CDMA standard.

6. The wireless communication method according to claim 5, wherein, when transmitting the communication initiation request in accordance with the LTE standard, initiation of the data communication is suspended even in a state where the communication information has been acquired.

7. The wireless communication method according to claim 6, wherein, in a case of receiving information indicating that communication is enabled in response to the communication initiation request in a state where the initiation of the data communication is suspended, the suspended initiation of the data communication is cancelled to initiate the data communication.

8. The wireless communication method according to claim 5, wherein, in a case of not receiving the information indicating that communication is enabled, a state where the communication information in accordance with the LTE standard has been acquired is maintained.

9. The wireless communication method according to claim 8, further comprising initiating data communication in accordance with the CDMA standard.

10. The wireless terminal device according to claim 1, wherein the communication control unit causes the wireless communication unit to initiate data communication in accordance with the CDMA standard following termination of communication in accordance with the LTE standard.

11. The wireless communication method according to claim 5, data communication is initiated in accordance with the CDMA standard following termination of communication in accordance with the LTE standard.

* * * * *